No. 740,040. PATENTED SEPT. 29, 1903.
M. PERKIEWICZ.
MANUFACTURE OF BRICKS.
APPLICATION FILED JUNE 1, 1903.
NO MODEL.
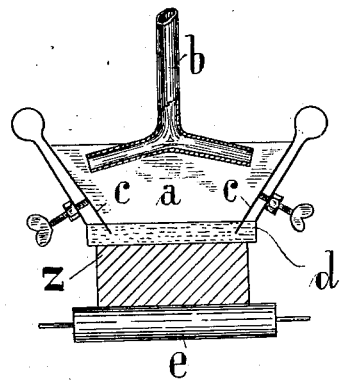
Witnesses.
J. T. Moore
F. N. Hubbard
Inventor.
Max Perkiewicz.
By Whitaker & Prevost
Attorneys.

No. 740,040. Patented September 29, 1903.

UNITED STATES PATENT OFFICE.

MAX PERKIEWICZ, OF LUDWIGSBERG, NEAR MOSCHIN, GERMANY.

MANUFACTURE OF BRICKS.

SPECIFICATION forming part of Letters Patent No. 740,040, dated September 29, 1903.

Application filed June 1, 1903. Serial No. 159,710. (No specimens.)

*To all whom it may concern:*

Be it known that I, MAX PERKIEWICZ, a subject of the Emperor of Germany, residing at Ludwigsberg, near Moschin, Germany, have invented new and useful Improvements in the Manufacture of Bricks, of which the following is a specification.

In the manufacture of bricks both in the drying and in the burning operations soluble salts discolor the surface thereof, so that the said bricks become spoiled or unsightly. It has been proposed to avoid these discolorations by coating the bricks immediately after they have been molded with flour paste; but this is only successful in the case of a few materials from which bricks are made, as the paste on drying is easily torn and peels off. The brick is therefore not sufficiently protected against discoloration. Furthermore, the dried paste possesses the disadvantage that contact with water (products of condensation) from the smoke gases produces visible results.

Now my experiments have shown that by employing a solution of gelatin in which flour is mixed I obtain a coating which not only during the drying process provides protection against the action of efflorescing salts, but also sufficiently prevents the deleterious action of deposits and condensation during smoking. I have found that a most suitable result is obtained with a mixture containing from one hundred and eighty to two hundred kilograms of water, eleven kilograms of gelatin, and eleven kilograms of flour. The flour and gelatin are each first stirred with water. The flour infusion or paste can be employed either cold or boiled. When used cold, it is allowed to stand for from one to two days in order that it shall become acid and ferment. The thus-prepared flour and water is then mixed with the gelatin solution. The paste formed of flour and gelatin and aluminium sulfate, if necessary, can be applied either by hand or by the device shown in the accompanying drawing in cases where the bricks are made in extrusion-machines. The device consists, essentially, of the skate-shaped chamber $a$, which is arranged above the brick column $z$, issuing from the brick-press in such a manner that a leather or felt strip $d$, attached to it, scrapes on the said column. The above-mentioned mixture is introduced into the chamber $a$ through the tube $b$, which distributes it in a suitable manner. The chamber $a$ contains two lateral insertions $c$, which are adjustable by means of screws and which have for their object to regulate the length of the chamber according to requirement. The thickness of the layer of material is regulated by the leather or felt strip $d$, which rests upon the brick column $z$, running on rollers $e$, and serves to homogeneously spread the coating over the said column. The dried coating protects the surface of the molded bricks from efflorescing salts and also offers protection against the action of the acid gases which are formed in the smoking process. Should the clay under treatment contain no aluminium sulfate, it is advisable to add a slight quantity to the flour and gelatin solution. The aluminium sulfate, for which alum could be substituted, possesses the property of hardening gelatin in so far as it is rendered insoluble and is not affected by water or moisture. In lieu of the aluminium sulfate any tanning liquor can be employed for rendering the gelatin insoluble. If on account of unsatisfactory preheating (smoking) condensation of moisture given off by the oven-gases should take place upon the still cold bricks on burning, the products of condensation are prevented by the gelatin and flour from penetrating to the surface of the brick. If the gelatin coating is hardened by the aluminium sulfate, the acid products of condensation do not dissolve it. The cause is to be seen in the fact that the soluble salts of the clay contain aluminium sulfate by which the gelatin coating is converted to a form in which it is insoluble in water and does not swell.

Having now particularly described and ascertained the nature of my said invention and in what manner the same is to be performed, I declare that what I claim is—

1. The process of manufacturing bricks, which consists in first shaping them, then coating them with a solution of gelatin and flour, substantially as described.

2. The process of manufacturing bricks which consists in first shaping them, then coating them with a solution of gelatin and flour, then drying and firing them, substantially as described.

3. The process of manufacturing bricks by applying to the surface thereof a solution of gelatin mixed with flour, and a material having a hardening effect upon gelatin, substantially as described.

4. The process of manufacturing bricks by applying to the surface thereof a solution of gelatin mixed with flour, and aluminium sulfate, substantially as described.

5. A protecting-coating for bricks previous to drying and firing consisting of a solution of gelatin and flour, substantially as described.

MAX PERKIEWICZ.

Witnesses:
STANISLAUS KARL HEPKE,
MICEZYSTAR LIPINSKI.